United States Patent [19]
Woodgate et al.

[11] Patent Number: 5,777,588
[45] Date of Patent: Jul. 7, 1998

[54] AUTOSTEREOSCOPIC DISPLAY HAVING A HIGH RESOLUTION 2D MODE

[75] Inventors: Graham Johm Woodgate, Henley-on-Thames; David Ezra, Wallingford; Basil Arthur Omar, Stanford-in-the-Vale, all of United Kingdom

[73] Assignee: Sharp Kabushiki Kaisha, Osaka, Japan

[21] Appl. No.: 572,887

[22] Filed: Dec. 18, 1995

[30] Foreign Application Priority Data

Dec. 16, 1994 [GB] United Kingdom ............... 9425761

[51] Int. Cl.$^6$ ............................................. G09G 5/00
[52] U.S. Cl. ........................ 345/6; 345/87; 359/458; 359/465; 348/52; 349/15
[58] Field of Search ............................ 348/51, 52, 54; 359/458, 462, 463, 464, 465, 466, 475; 345/4, 5, 6, 87; 349/15, 5, 62; 249/16

[56] References Cited

U.S. PATENT DOCUMENTS

| | | |
|---|---|---|
| 4,630,097 | 12/1986 | Marks ............................. 358/3 |
| 5,040,878 | 8/1991 | Fichenlaub ...................... 349/62 |
| 5,493,427 | 2/1996 | Nomura .......................... 349/5 |

FOREIGN PATENT DOCUMENTS

| | | |
|---|---|---|
| 0389842 | 10/1990 | European Pat. Off. . |
| 0540137 | 5/1993 | European Pat. Off. . |
| 0602934 | 6/1994 | European Pat. Off. . |
| 0656555 | 6/1995 | European Pat. Off. . |
| 9406249 | 3/1994 | WIPO . |

OTHER PUBLICATIONS

U.K. Search Report for U.K. Appl. 9425761.5, Mailed Feb. 24, 1995.

Search Report For European Appl. 95309179.0, Mailed Jun. 3, 1996.

Isono et al, Electronics & Communication in Japan, Pt. 2, 76(1993) Jul., No. 7, New York, pp. 77–83, "Autostereoscopic 3D Display Using LCD-Generated Parallax Barrier."

*Primary Examiner*—Dennis-Doon Chow

[57] ABSTRACT

An autostereoscopic display has first and second spatial light modulators. Images from the spatial light modulators are combined by a beam combiner before being presented to a viewing region. The relative positions of the first and second spatial light modulators are controlled such that pixels of the second spatial light modulator are interspersed with pixels of the first spatial light modulator. Such an arrangement allows an effective doubling of resolution when the spatial light modulators are operated so as to produce a two dimensional image instead of a three dimensional images.

22 Claims, 13 Drawing Sheets

3D Mode

2D Mode

AUTOSTEREOSCOPIC DISPLAY HAVING A HIGH RESOLUTION 2D MODE

The present invention relates to a display.

TECHNICAL FIELD OF THE INVENTION

A number of three dimensional (3D) display devices, such as those using a lenticular screen, may also be operated so as to display a two dimensional (2D) image. The resolution of such displays is the same in the 2D and 3D modes. However, some image data, such as text, needs, in general, to be presented with as great a resolution as possible in order to maintain legibility.

BACKGROUND OF THE INVENTION

According to a first aspect of the present invention there is provided an autostereoscopic display having a first resolution in a three dimensional display mode and a two dimensional display mode having a second resolution greater than the first resolution.

SUMMARY OF THE INVENTION

It is thus possible to provide an autostereoscopic display having enhanced resolution in a 2D mode. Advantageously the display may simultaneously display a 3D image and a 2D image. This may be of great benefit when a display is used as an output device of a computer.

Preferably the display comprises at least two spatial light modulators arranged such that, in a two dimensional mode of operation of the display, picture regions of the image produced by a first spatial light modulator are interspersed with picture regions of the image produced by the or each other spatial light modulator thereby giving enhanced resolution in the two dimensional mode compared to the resolution in the autostereoscopic mode.

Preferably the display further comprises at least one beam combiner for combining the images produced by the first and second spatial light modulators.

Preferably the display produces a display output comprising a plurality of "windows", the windows being substantially contiguous at a nominal viewing position when in the autostereoscopic mode and being overlapping when in the two dimensional mode.

Preferably the spatial extent of the illumination source for each spatial light modulator is controllable, such that the illumination source has a first spatial extent when the display is operated in the autostereoscopic mode and a second spatial extent greater than the first spatial extent when in the two dimensional mode.

An autostereoscopic display operates by presenting different views to each eye of an observer. EP-A-0 602 934 discloses, amongst other things, a beam combiner type display. In a basic form, the display comprises a plurality of spatial light modulators each illuminated by a respective light source (which may comprise a plurality of light emitting elements). An imaging system is included such that images of the light sources modulated by the respective spatial light modulators are directed along predetermined directions and, more specifically, are formed at "windows" at a nominal viewing position. An observer's eyes are positioned in different windows and each window displays a different view.

For example, a system having two windows (which may form a cyclically repeating pattern) may be arranged such that the left eye observes the first window and the right eye observes the second window when in an autostereoscopic mode. Switching to a two dimensional mode causes the windows to become extended and overlapping (by virtue of extending the light sources) such that each of the observer's eyes simultaneously observes both the first and second windows.

The positions of the light sources with respect to the imaging systems may be varied so as to compensate for movement of the observer. The movement may involve physical translation of the light source or simulated movement such as controlling the position of a light transmitting region of an otherwise non-transmissive spatial light modulator adjacent a spatially extended diffuse light source. An example of an observer tracking display is disclosed in EP-A-0 656 555.

The at least two spatial light modulators may be illuminated via optical elements such as Fresnel lens or double lenticular screen amplifiers (such an amplifier is known per se, but is illustrated in FIG. 4 of EP-A-656 555) or by a common light source. The light source may be movable with respect to the optical elements and the spatial light modulators. Alternatively the light source may comprise a plurality of light emitting elements which are individually controllable. The light emitting elements may be adjacent a plurality of lenses. As a further alternative, the display may further comprise at least first and second light sources and optical elements for illuminating at least first and second spatial light modulators, respectively. Each of the first and second light sources may comprise a plurality of light emitting elements which are individually controllable.

In those arrangements having one or more light sources comprising a plurality of light emitting elements, the spatial extent of the light source can be controlled by varying the number of elements which are on simultaneously. The or each light source may comprise a further spatial light modulator adjacent an extended light source.

Advantageously the display may comprise at least two electrically controllable diffusing elements switchable between a substantially non-diffusing mode and a diffusing mode and optically arranged in series with respective ones of the spatial light modulators for controllably diffusing light incident on the spatial light modulators. The electrically controllable diffusing elements may be polymer dispersed liquid crystal panels. Each panel may be adjacent the associated spatial light modulator.

Alternatively the at least two spatial light modulators may be spatially multiplexed within a single spatial light modulator. Such an arrangement may have first and second orthogonal polarisers associated with individual pixels in a chess-board like arrangement. The pixels arranged to pass a first polarisation of light display a first view whereas the pixels arranged to pass a second orthogonal polarisation of light display a second view. The spatial light modulator is illuminated by non-overlapping sources of the first and second polarisations to image the first and second views to different eyes of an observer. The light source can be replaced by a source of diffuse non-polarised light or light polarised along a third direction resolvable into components along the first and second directions to give a high resolution 2D mode in which the light transmitted by each of the spatial light modulators is observable by both of the observer's eyes. As a further alternative, the spatial extents of the sources of the first and second polarisations may be increased, for example by physically increasing the size of the light emitting areas or by using a diffuser, when in the 2D mode. The first and second lights may be circularly polarised.

The positions of the sources of the first and second polarisations of light may be movable so as to accommodate movement of the observer.

According to a second aspect of the present invention, there is provided a display comprising first display means for producing a three dimensional image at an image plane and second display means for producing a two dimensional image adjacent the three dimensional image and in the image plane.

BRIEF DESCRIPTION OF THE DRAWINGS

The present invention will further be described, by way of example, with reference to the accompanying drawings, in which.

DETAILED DESCRIPTION OF THE PREFERRED EMBODIMENTS

Figure 1:
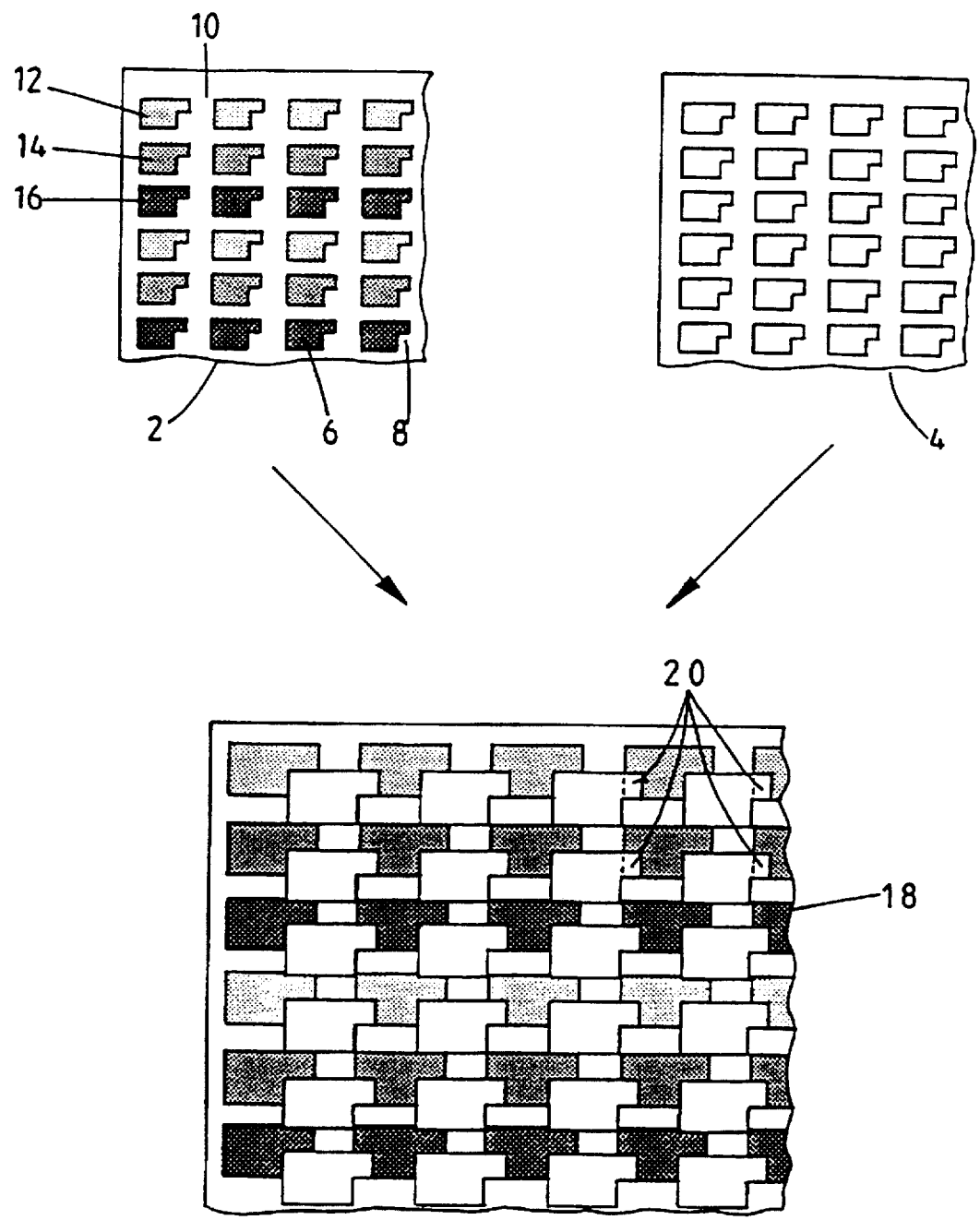
FIG. 1 is a schematic diagram showing the pixel shapes on first and second display devices and how these are spatially related to give a high resolution 2D mode in a first embodiment of the present invention.

Three dimensional autostereoscopic display devices of the type described in EP-A-0 602 934 combine images from first and second spatial light modulators (SLMs) with a beam combiner. Such an arrangement may be modified to produce a high resolution 2D display. FIG. 1 schematically illustrates the pixel arrangement within the first and second SLMs 2 and 4, respectively. This pixel arrangement is typical of that found in thin film transistor liquid crystal display (LCD) panels. As shown, each SLM is a liquid crystal display comprising a plurality of substantially rectangular pixels 6. A small region at the corner of each pixel contains a thin film transistor 8 for driving the respective pixel 6. The transistor 8 is typically covered by a black mask 10 which also separates adjacent pixels from one another. The pixels 6 may be arranged in rows of red pixels 12, blue pixels 14 and green pixels 16 so as to provide a colour display. The first and second SLMs 2 and 4 are identical. The regions of light modulated by the pixels 6 of the first and second SLMs 2 and 4 are arranged to be combined by a beam combiner such that the pixels of the second SLM are interspersed and, to an extent, non-overlapping with the pixels of the first SLM, as shown in the composite image 20 of FIG. 1. Such an arrangement requires the relative positions of the first and second SLMs 2 and 4 to be controlled to a tolerance of approximately 25 μm.

By control of appropriate information to each SLM, a high resolution 2D image may be produced. For example, two SLMs driven at the resolution of VGA (640×480 colour pixels) graphics systems could generate a 2D image having, for example, a resolution of 1280×480 pixels.

Figure 2:
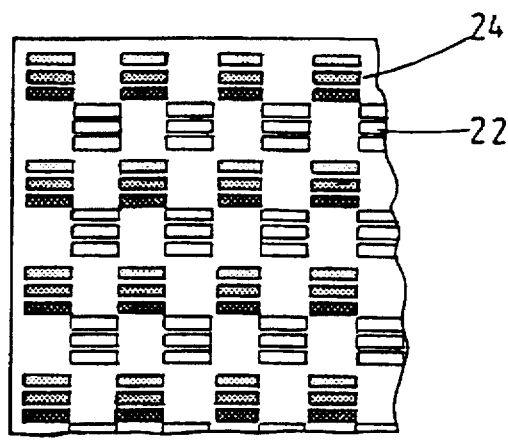
FIG. 2 is a schematic diagram showing the spatial relationship between pixels of first and second display devices within a display constituting a second embodiment of the present invention.
Figure 4:
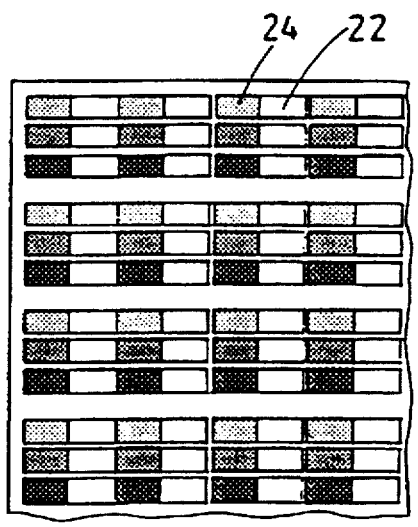
FIG. 4 is a schematic diagram showing the spatial relationship between pixels of first and second display devices within a display having enhanced resolution in a horizontal direction and constituting a fourth embodiment of the present invention.
Figure 3:
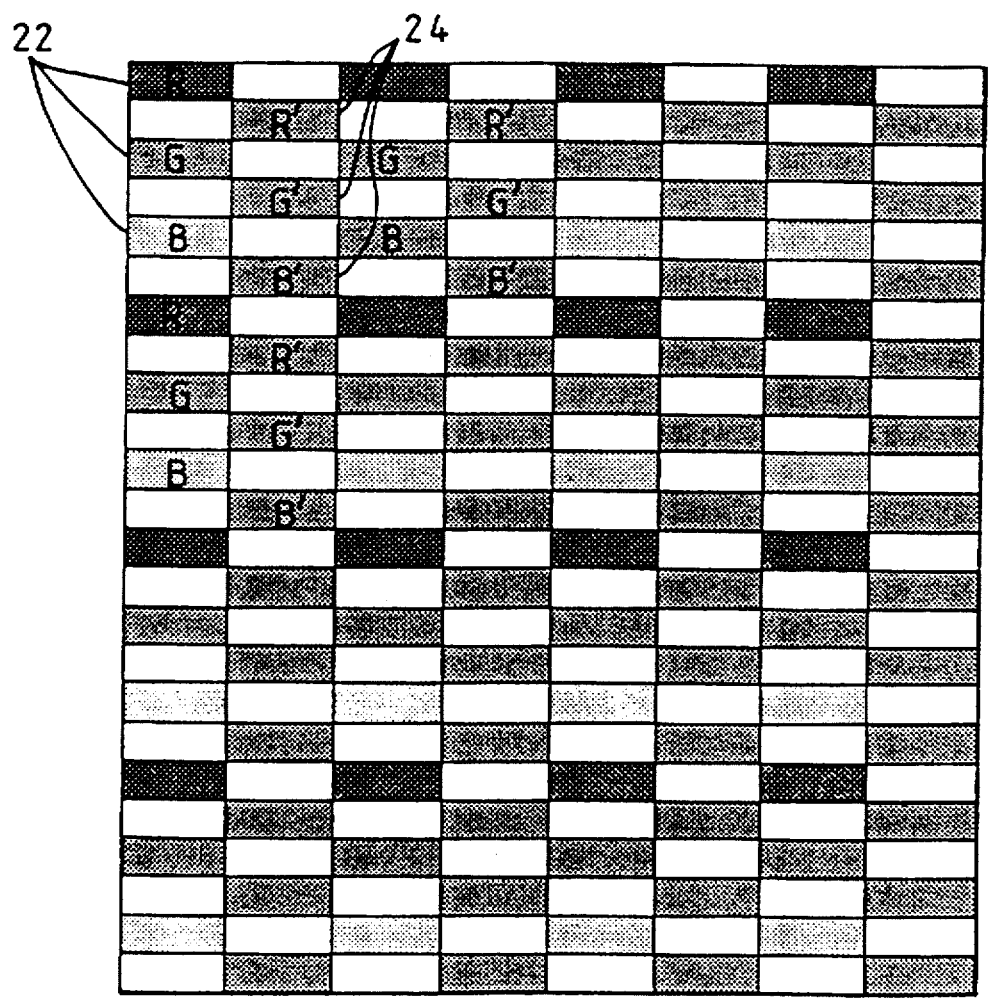
FIG. 3 is a schematic diagram showing the spatial relationship between pixels of first and second display devices within a display constituting a third embodiment of the present invention.

The arrangement shown in FIG. 1 has a region 20 of overlap between pairs of pixels in each line. The overlap can be removed by modifying the pixel configuration of the LCD panels, as shown, for example, in FIGS. 2, 3 and 4. In the display shown in FIG. 2, the pixels 22 of the second SLM 4 are laterally and vertically offset with respect to the pixels 24 of the first SLM 2 such that no overlap occurs. Such an arrangement gives increased resolution in the horizontal and vertical directions. A similar arrangement is shown in FIG. 3. The display shown in FIG. 4 gives increased resolution only in the horizontal direction. The pixels 22 of the second SLM 4 are laterally offset with respect to the pixels 24 of the first SLM 2. However, the pixels 22 and 24 are not vertically offset with respect to one another.

Figure 5A:
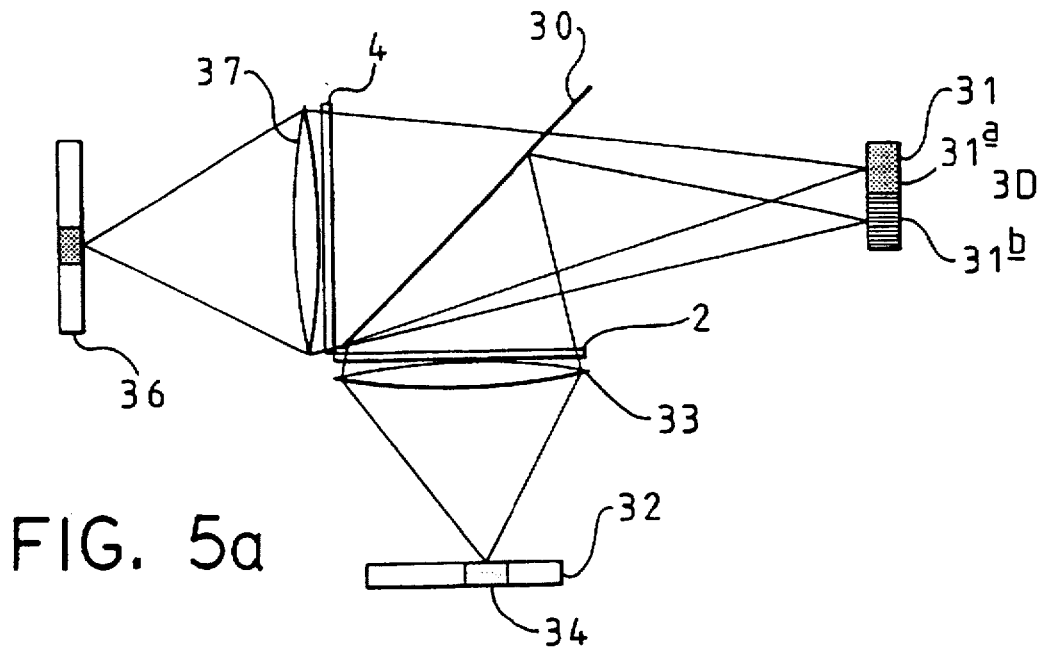
FIG. 5a is a schematic diagram showing the illumination pattern of a display constituting a fifth embodiment of the present invention in a 3D mode.
Figure 5B:
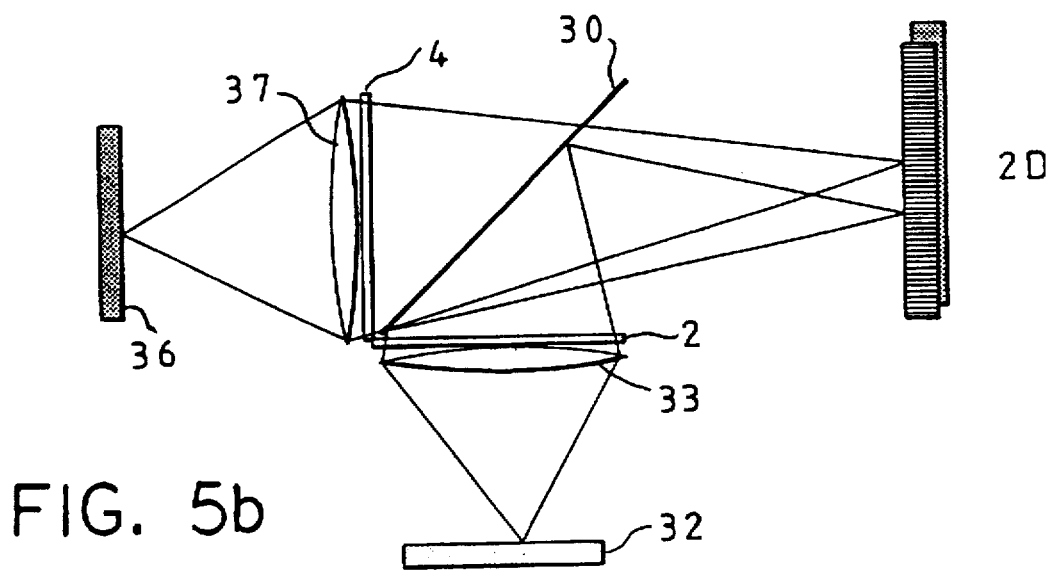
FIG. 5b shows the illumination pattern of the display of FIG. 5a in a 2D mode.

FIGS. 5a and 5b show an embodiment of the present invention operating in 3D and 2D modes, respectively. Images presented to the first and second SLMs 2 and 4 are combined at a beam combiner 30 before presentation to an observer at a viewing region 31 comprising a plurality of windows 31a and 31b. The first SLM 2 is illuminated by a first illuminator 32 via a lens 33. The first illuminator 32 comprises a plurality of individually controllable light sources. Figure 5a shows one light source 34 of the first illuminator 32 illuminated, whereas the other light sources of the first illuminator 32 are unilluminated. Light from the first illuminator is directed towards the first SLM by the lens 33. The second SLM 4 is illuminated by a second illuminator 36 via a lens 37. The second illuminator 36 also comprises a plurality of individually controllable light sources, only one of which is illuminated at a given time when the display is operating in a 3D mode.

FIG. 5b illustrates the display of FIG. 5a operating in a 2D mode. All of the light sources within the first and second illuminators are illuminated so as to cause the image formed by each SLM to be viewable by both eyes.

Figure 6A:
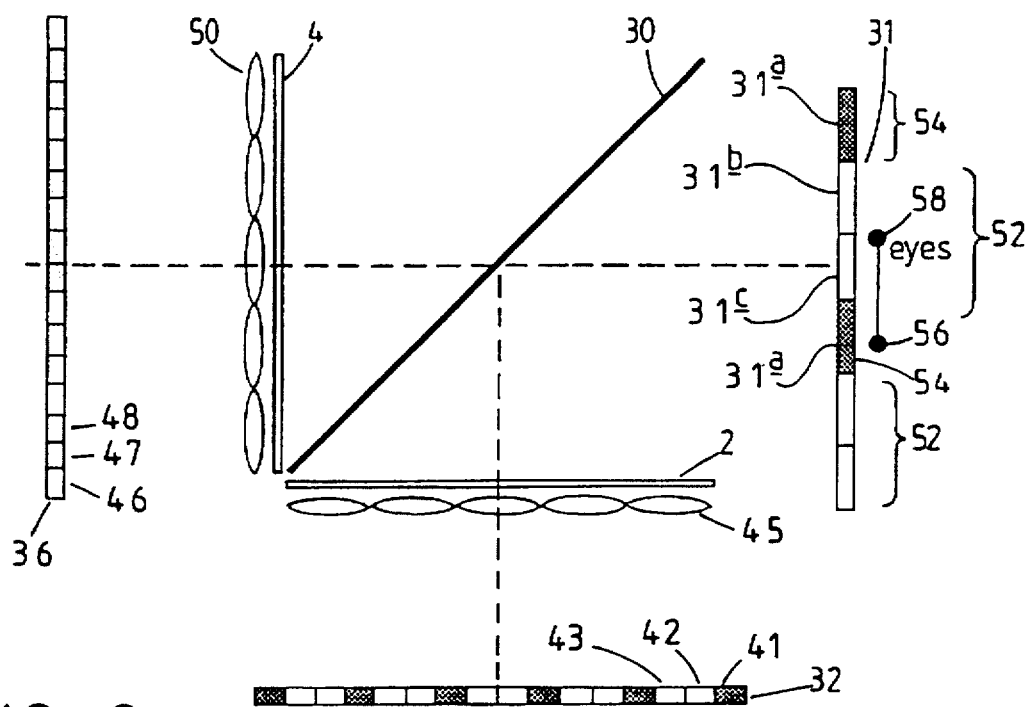
FIG. 6a is a schematic diagram showing the illumination pattern of a display operating in a 3D mode and constituting a sixth embodiment of the present invention.
Figure 6B:
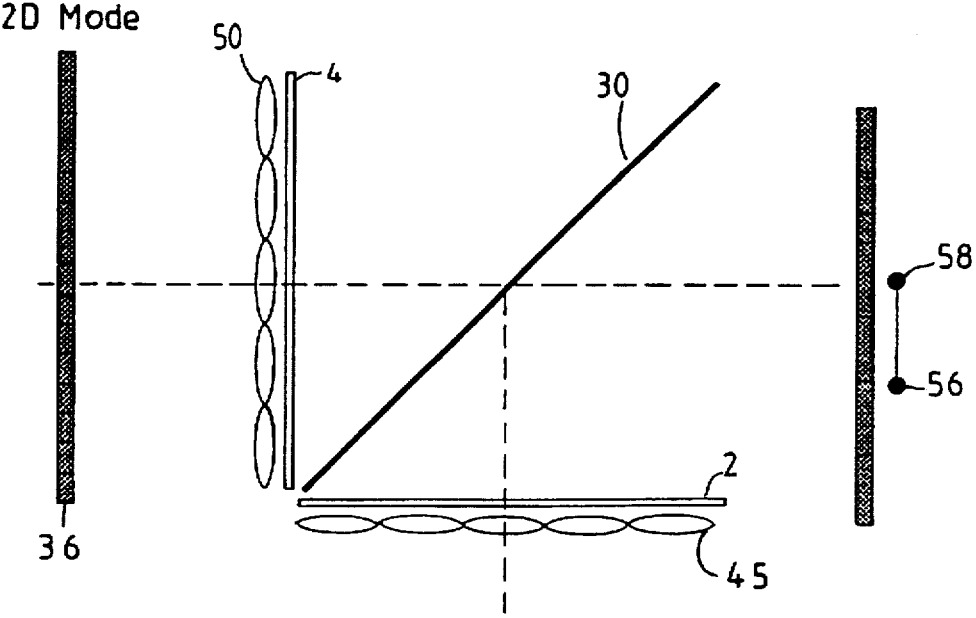
FIG. 6b shows the illumination pattern for the display of FIG. 6a in a 2D mode.

FIGS. 6a and 6b show another embodiment of the invention operating in 3D and 2D modes, respectively. The embodiment is similar to that shown in FIGS. 5a and 5b, and like reference numerals refer to like parts. Images presented to the first and second SLMs 2 and 4 are combined at a beam combiner 30 before presentation to an observer at a viewing region 31. The first SLM 2 is illuminated by a first illuminator 32 comprising a plurality of individually controllable light sources. As shown, the illuminator 32 is controlled such that a first light source 41 is illuminated whereas second and third light sources 42 and 43 are unilluminated. The pattern of illumination is repeated along the length of the illuminator 32. Light from the illuminator 32 is directed towards the first SLM 2 by an array of lenses 45. The second SLM 4 is illuminated by a second illuminator 36. As shown, a first light source 46 is un-illuminated, whereas second and third light sources 47 and 48 are illuminated. The illumination pattern is repeated along the length of the second illuminator 36. Light from the second illuminator 36 is directed towards the second SLM 4 via a second array of lenses 50.

The first and second SLM's are presented with image data corresponding to the views to be presented to the left and right eyes of an observer. The position of the illuminated elements of the first and second illuminators 32 and 36 with respect to their respective lenses or lens arrays and SLMs are such that the views for the left and right eyes are directed to different regions 52 and 54 within the viewing region 31 (comprising windows 31a, 31b and 31c in a repeating pattern). As shown in FIG. 6a, the left eye 56 of an observer is within the region 54 whereas the right eye 58 is within the region 52. Thus the observer sees an autostereoscopic image.

In order to operate the display in a 2D mode; all of the light sources within the first and second illuminators 32 and 36 are switched on. Thus the Image data on each SLM 2 and 4 is simultaneously presented to each of the observer's eyes as represented in FIG. 6b.

Figure 7A:
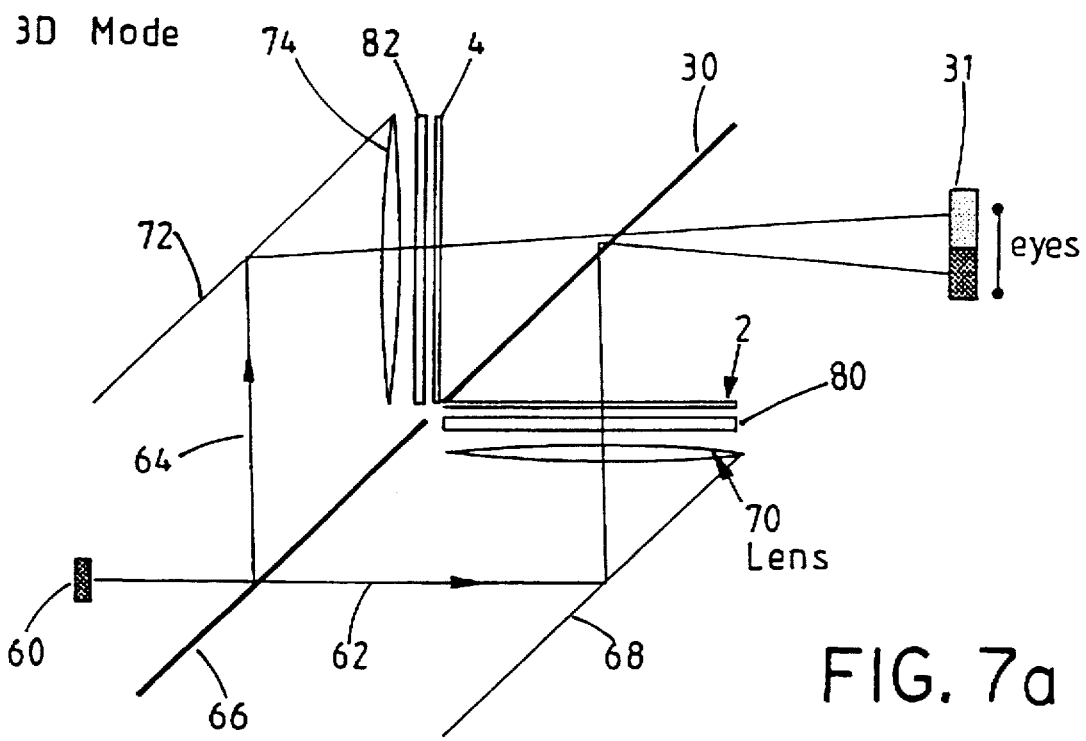
FIG. 7a is a schematic diagram showing a display having electrically controllable diffusing elements and constituting a seventh embodiment of the present invention and operating in a 3D mode.
Figure 7B:
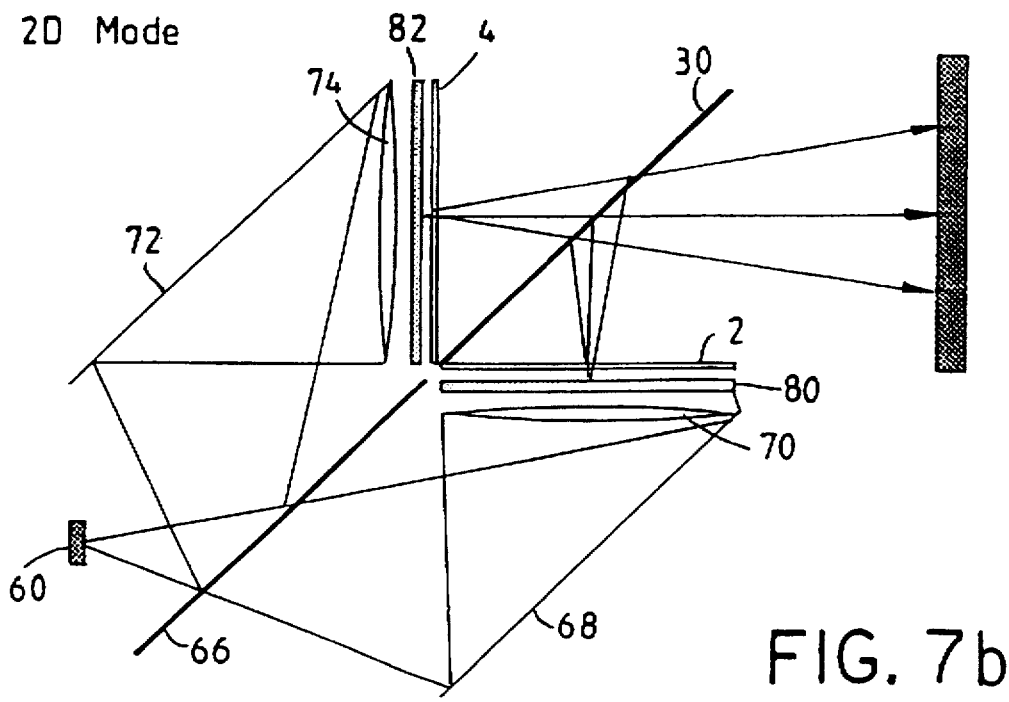
FIG. 7b shows the display of FIG. 7a in a 2D mode.

The embodiment shown in FIGS. 7a and 7b has a single movable light source 60. The light therefrom is split into first and second paths 62 and 64 by a beam splitter 66. The light in the first path 62 is deflected by a mirror 68 towards the first SLM 2. A lens 70 acts to direct the light towards the SLM 2 forming an image of the light source at the viewing region. A similar arrangement is provided for light in the second path 64. The light is directed from the beam splitter 66 towards the second SLM 4 via a second mirror 72, positioned at a slightly different angle (i.e. not parallel) to the first mirror 68, and a second lens 74. The images produced by the first and second SLMs 2 and 4 are merged by a beam combiner 30 and directed towards a viewing region 31.

The position of an observer can be determined by an observer tracking system (not shown) which moves the light source 60 so that the viewing region 31 is maintained at the eyes of the observer. Thus, the observer views the display autostereoscopically throughout an enlarged viewing range and has a greater freedom of movement. Observer tracking displays of this type are disclosed in EP 0 656 555.

An observer at the viewing region will see an autostereoscopic image by virtue of observing one SLM with one eye and the other SLM with the other eye. A first electrically controllable diffuser 80 is positioned between the lens 70 and the SLM 2. Similarly, a second electrically controllable diffuser 82 is positioned between the lens 74 and the SLM 4. The diffusers 80 and 82 comprise a polymer dispersed liquid crystal panel. The diffusers 80 and 82 are controlled so as to be clear when in the 3D mode shown in FIG. 7a and to diffuse light when in the 2D mode shown in FIG. 7b. The display may become dimmer when operating in the 2D mode due to the larger cone angle of the diffuse light. This can be compensated for by adjusting the brightness of the light sources.

Figure 8A:
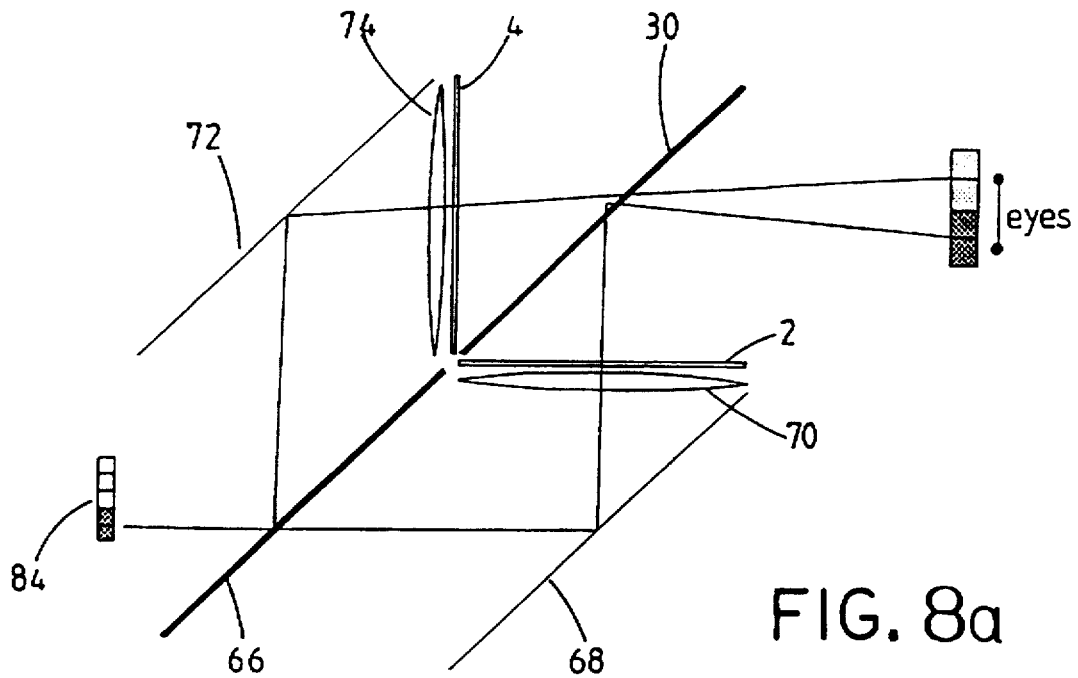
FIGS. 8a and 8b are schematic diagrams showing a display constituting an eighth embodiment of the present invention operating in a 3D mode and a 2D mode, respectively.
Figure 8B:
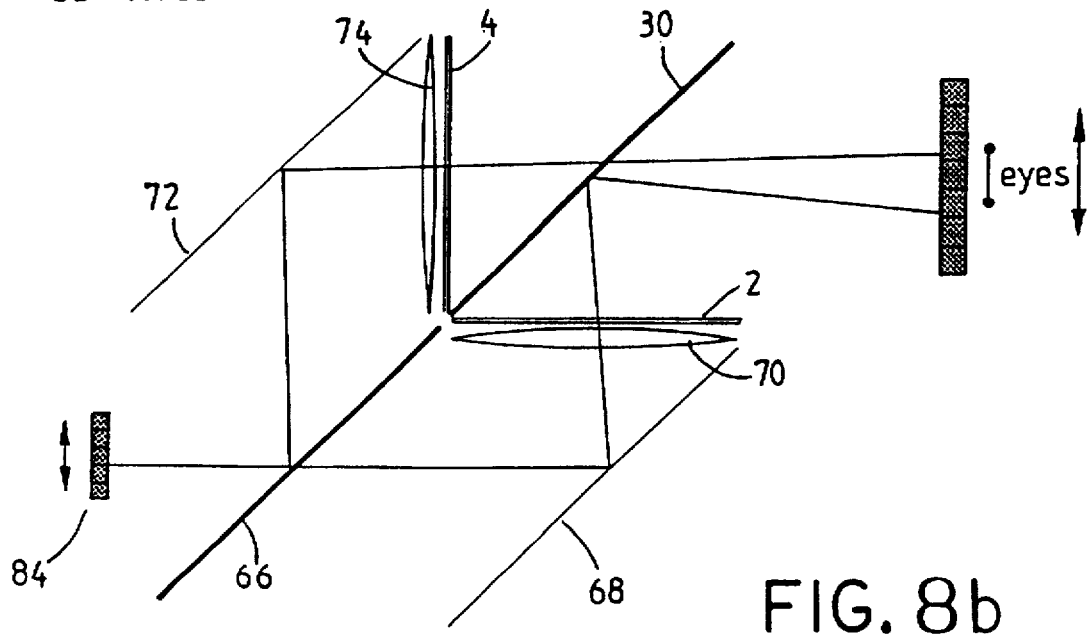

In a further embodiment (FIGS. 8a and 8b) which is a modification of the embodiment shown in FIGS. 7a and 7b, an illuminator 84 comprising a plurality of individually controllable light sources is substituted in place of the light source 60. Furthermore, the electrically controllable diffusers 80 and 82 are omitted. Only a few of the light sources within the illuminator 84 are illuminated when in a 3D mode, whereas the entire illuminator is illuminated in a 2D mode. Furthermore, the illuminator 84 may be fixed or movable. As before, the images formed by the first and second SLMs 2 and 4 are presented to different regions within the viewing region 31 when in the 3D mode, whereas the images are presented simultaneously to each eye of the observer when in the 2D mode.

Figure 9:
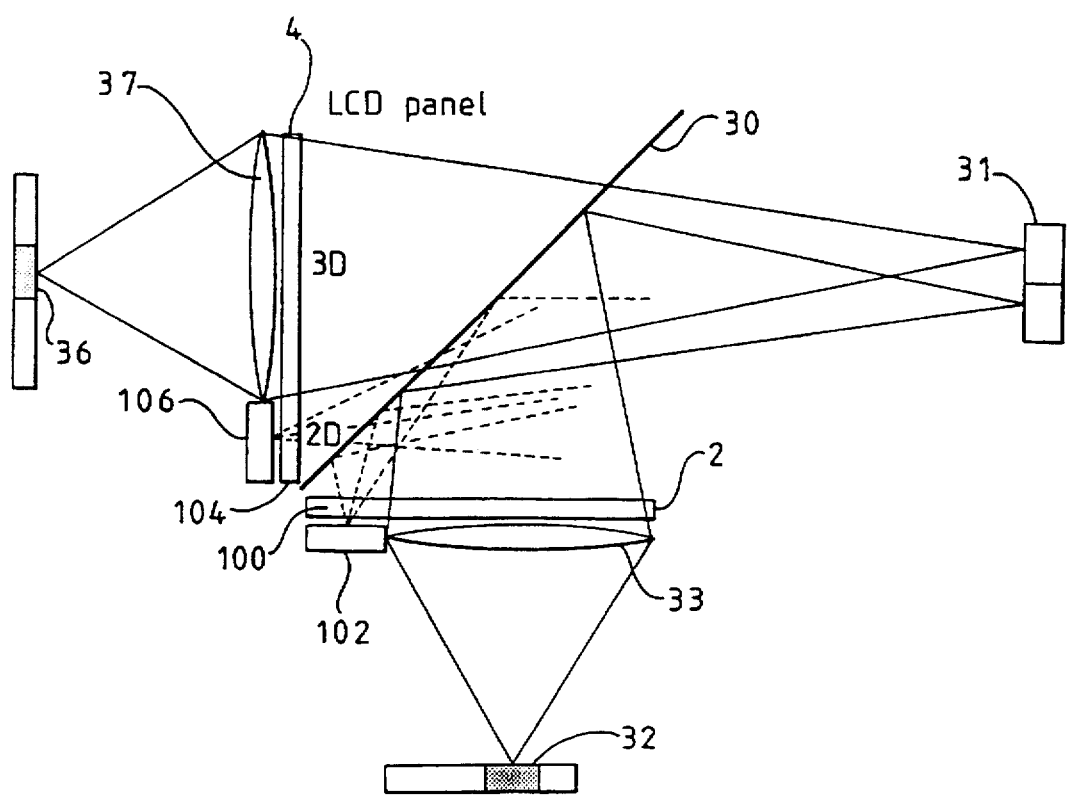
FIG. 9 is a schematic diagram of a display capable of simultaneously displaying a 3D image and a high resolution 2D image, and constituting a ninth embodiment of the present invention.

FIG. 9 schematically illustrates a display capable of simultaneously displaying both 2D and 3D images in a first mode and a single high resolution 2D image in a second mode. The display can be considered as being a modification of the display shown in FIG. 5. Each SLM 2 and 4 is illuminated by respective illuminators 32, 36 via respective lenses 33 and 37. However, a portion 100 of the first panel 2 is illuminated by a diffuse light source 102. Similarly a portion 104 of the second panel is illuminated by a diffuse light source 106. The images from regions 100 and 104 are combined by the beam combiner 30 to create a high resolution 2D image. The images from the remainder of the SLMs combine to provide an autostereoscopic image.

Figure 10:
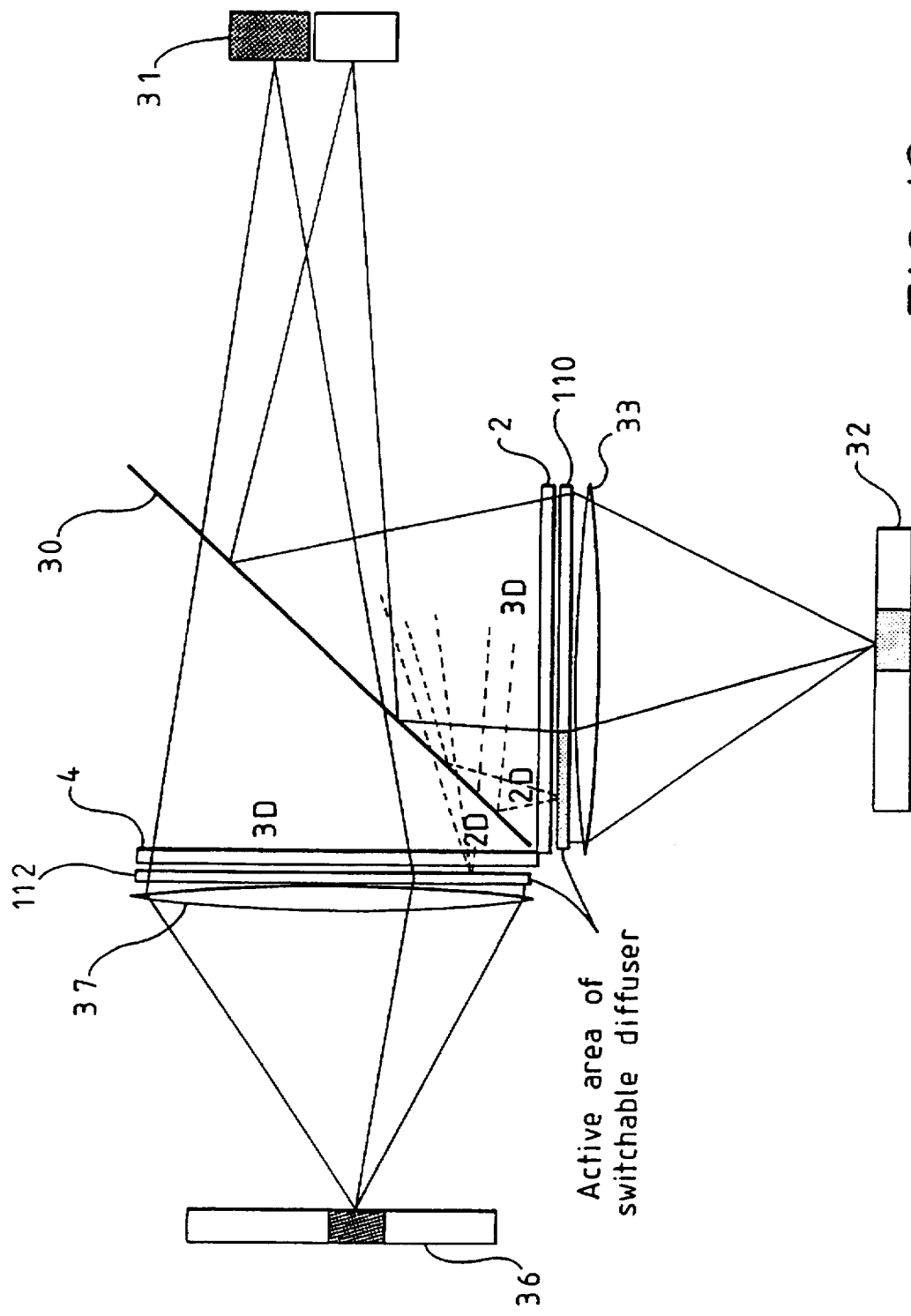
FIG. 10 is a schematic diagram of a display constituting a tenth embodiment of the present invention.

FIG. 10 shows an embodiment which is a variation on that shown in FIG. 9. A switchable diffuser 110 is placed between the lens 33 and the first spatial light modulator 2. Part of the diffuser may be made diffusing such that the associated region of the SLM 2 becomes a source of a 2D image. A similar diffuser 112 is located between the lens 37 and the second SLM 4. Thus, when corresponding areas of the diffusers 110 and 112 are switched to a diffusing state, a high resolution 2D image can be generated in conjunction with the 3D image. Use of electrically controllable diffusers enables the 2D image to be positioned at any place in the display output.

Figure 11:
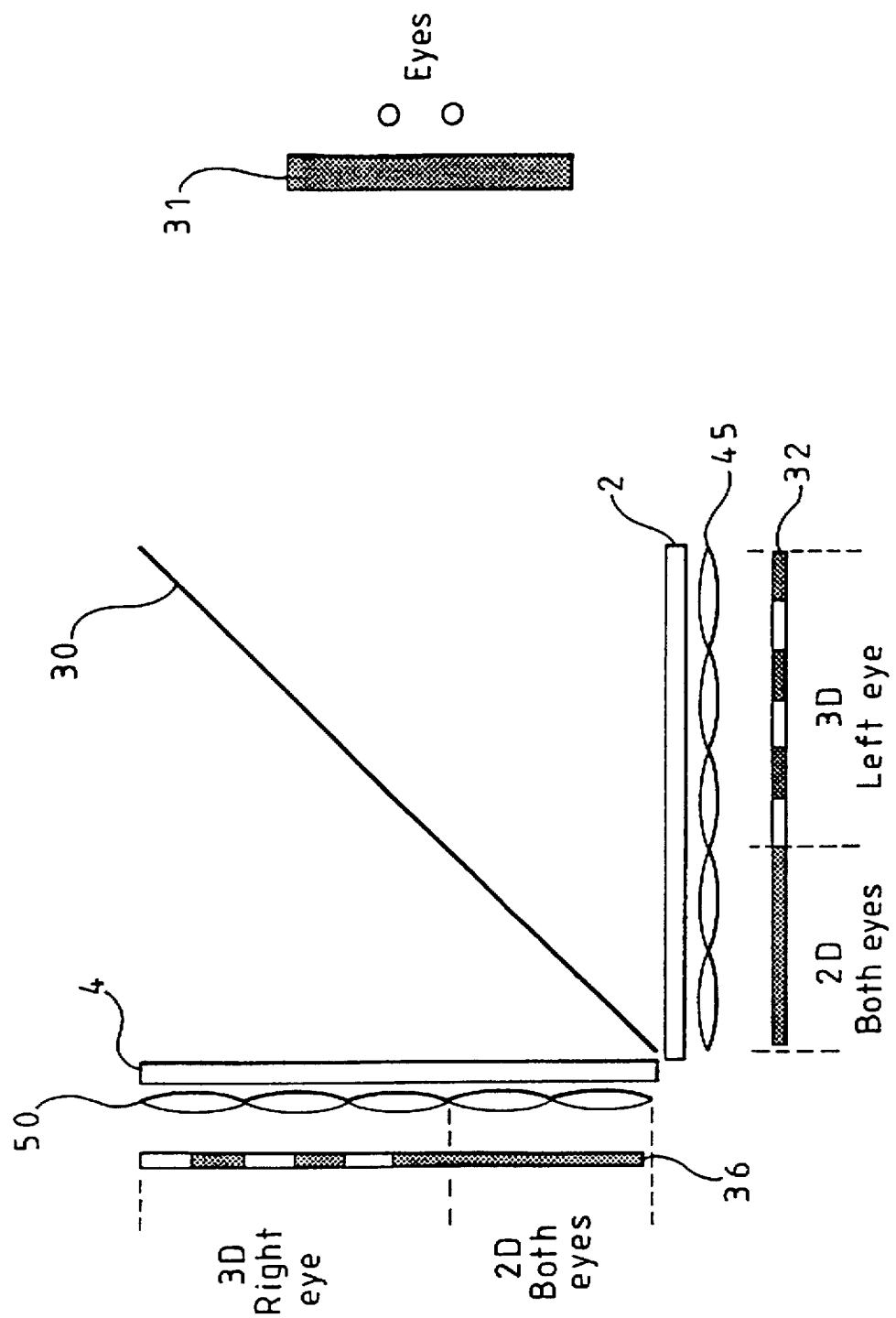
FIG. 11 is a schematic diagram of a display constituting an eleventh embodiment of the present invention.

FIG. 11 illustrates a variation on the embodiment shown in FIG. 6. The illuminators 32 and 36 are divided as illustrated by the broken lines into two portions. The right portion of the illuminator 32 and the upper portion of the illuminator 36 are controlled in the same way as described with reference to FIG. 6a for autostereoscopic viewing and the left and right images are displayed by the aligned portions of the SLMs 2 and 4, respectively. The left portion of the illuminator 32 and the lower portion of the illuminator 36 are controlled in the same way as described with reference to FIG. 6B for 2D viewing, and the aligned portions of the SLMs 2 and 4 display an interlaced 2D image. The division of the illuminators 32 and 36 into the two portions can be controlled electronically and depends on how the individual light sources are operated. Thus, it is possible to vary the position and size of the 2D image in the same way as for the embodiment shown in FIG. 10.

Figure 12:
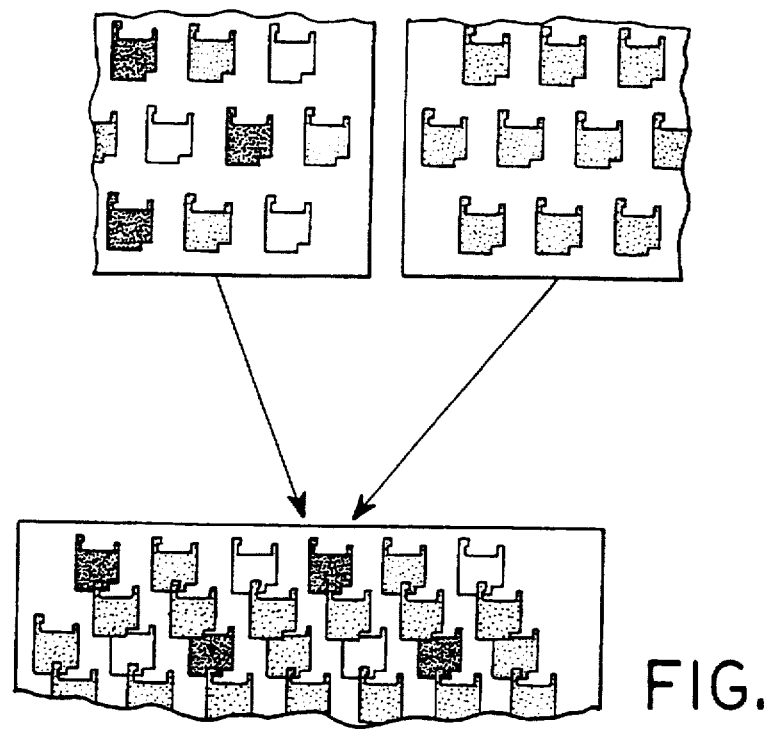
FIGS. 12, 13 and 14 are schematic diagrams illustrating further arrangements of pixel shapes on first and second display devices and how these are spatially related to give a high resolution 2D display mode.
Figure 13:
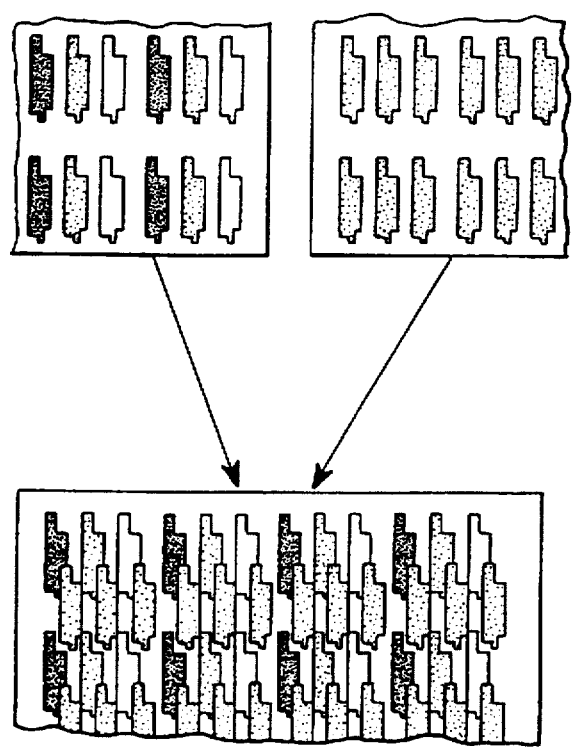
Figure 14:
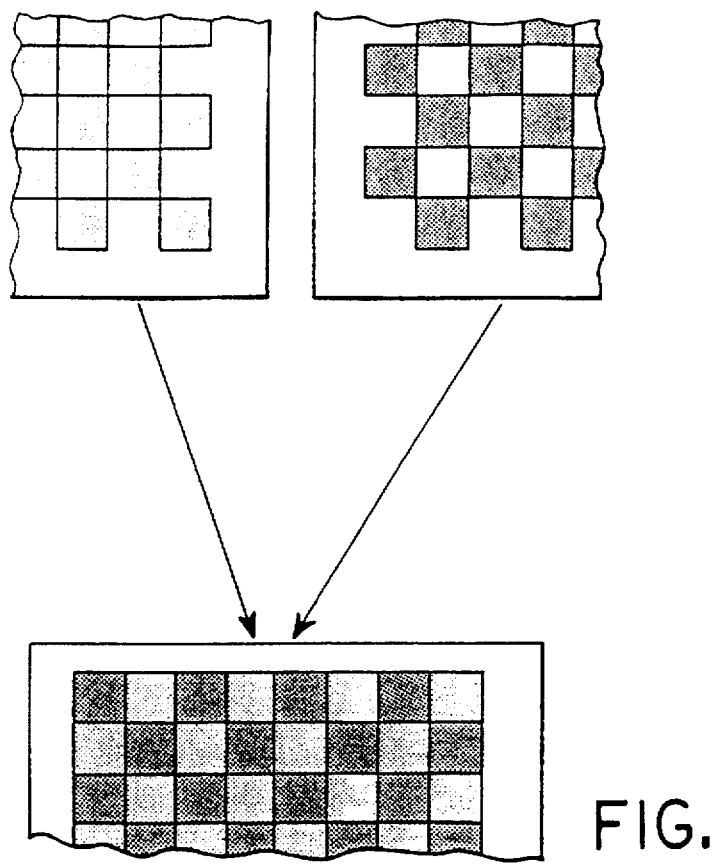

FIGS. 12, 13 and 14 show alternative pixel patterns on the first and second SLMs 2 and 4. The patterns shown in FIGS. 12 and 13 are representative of some of the pixel configurations found in thin film transistor twisted nematic liquid crystal displays. The chessboard or checkerboard arrangement shown in FIG. 14 enables a fill factor of substantially 100% to be achieved, thus giving a bright display.

In each of the embodiments described hereinabove, the spatial light modulators will display respective ones of the stereo-image pair (i.e. left eye view and right eye view) when operating in a 3D mode. When all or part of the display is switched to a high resolution mode, the image data within the 2D view region is changed such that each display displays alternate pixels of the same view.

Figure 15:
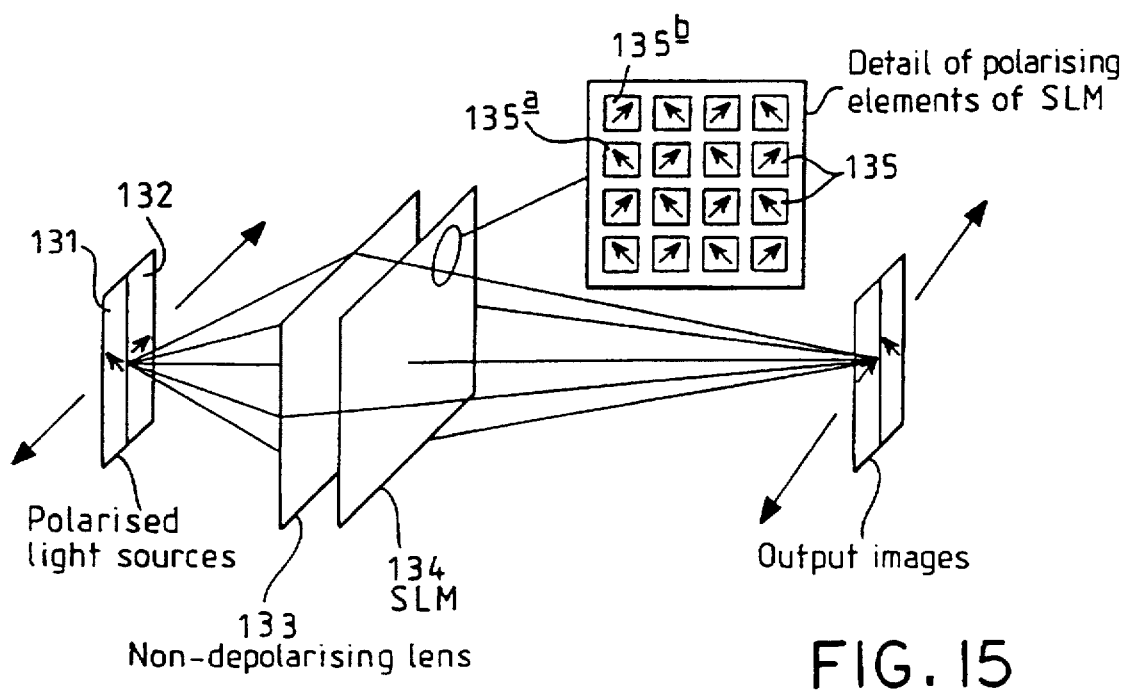
FIG. 15 is a schematic illustration of a display having first and second displays spatially multiplexed within a single spatial light modulator and constituting a further embodiment of the present invention.

FIG. 15 shows a display in which the spatial light modulator 134 is sub-divided into pixels 135a arranged to transmit light linearly polarised along a first direction and pixels 135b arranged to transmit light linearly polarised along a second direction orthogonal to the first direction. The first pixels 135a effectively form a first spatial light modulator interspersed amongst the pixels 135b of a second spatial light modulator. Polarised light sources 131 and 132 emit light polarised along the first and second directions, respectively. Alternatively, the pixels 135a and 135b may transmit left handed and right handed circularly polarised light, respectively, and the light sources 131 and 132 may emit left handed and right handed circularly polarised light, respectively.

The light from the light sources is imaged through a lens 133 such that, in use, light from the first light source 131 impinges only on a first eye of an observer and is modulated by the pixels 135a of the first spatial light modulator, whereas light from the second light source 132 impinges only on a second eye and is modulated by the pixels 135b of the second spatial light modulator. The display can be used in a 2D high definition mode by illuminating the SLM 134 with diffuse non-polarised light such that all of the pixels cooperate to modulate the light passing therethrough to form a single image viewable by both eyes of the observer. Alternatively, the light source for use in the 2D mode may have a polarisation which is resolvable into components along the first and second directions, the components In these directions being of substantially equal intensity.

In a further variant, the spatial extent of each of the light sources 131 and 132 may be extended when in the 2D mode in a manner similar to that described hereinabove with reference to FIG. 5 of the accompanying drawings. A diffuser, similar to that described with reference to FIGS. 7 and 10, may also be used to allow switching between 2D and 3D modes.

The light sources 131 and 132 may be movable with respect to the lens 133 to allow observer tracking to be performed, as described in EP-A-0 656 555.

In many applications of 3D displays, such as computer aided design (CAD), information to be displayed can be divided into 3D information and 2D information. The 3D information is generally required to be graphical, may be in colour, and may represent movement. The 2D information may comprise any combination of a graphical user interface (GUI), text, button bars, icons, fixed colour or monochrome, with rapid movement mainly limited to a cursor.

Figure 16:
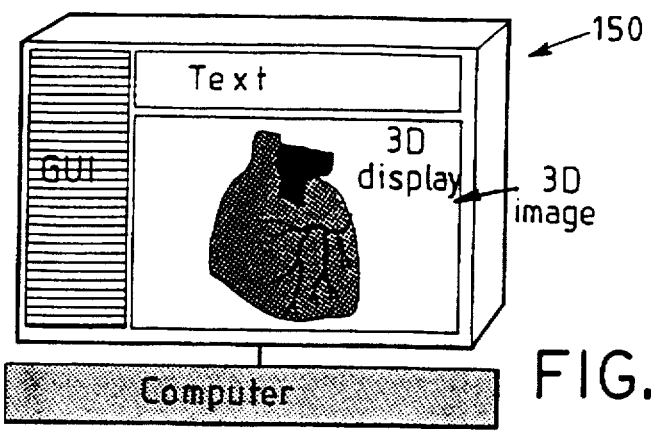
FIG. 16 illustrates an autostereoscopic display displaying a mixture of 3D, 2D and graphical user interface (GUI) information.

FIG. 16 illustrates one possible approach in which a 3D display 150 is used to display all of the information, for instance shown in the drawing as a 3D image, text, and GUI. However, by using a 3D display to display 2D information, the size of the 3D image is reduced as is the number of image pixels which are available for the 3D image. Further, frame cancelling increases as the GUI information imposes on the 3D frame. Frame cancelling is an effect where the frame of a 3D image display reduces the perceived effectiveness of the 3D image. This is reduced as the size of the image increases. Schematic diagrams of the optical systems needed to achieve the above are shown in FIGS. 9, 10 and 11.

Figure 17:
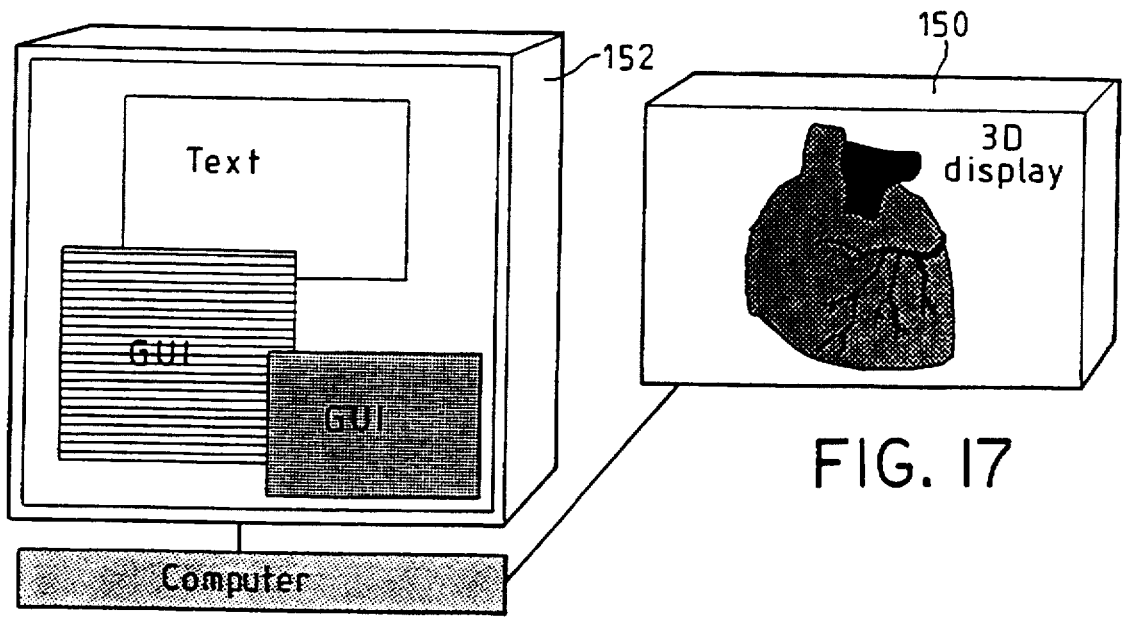
FIG. 17 Illustrates a display having a dedicated 2D display for displaying text, GUI and the like, alongside a 3D display.

FIG. 17 illustrates another approach in which the 3D display 150 is used exclusively for the 3D image and a separate 2D monitor 152 is provided for displaying text, GUI, and the like. The 2D display 152 may comprise a high resolution cathode ray tube which may be used for data input with all its advantages as a flexible high resolution 2D work station display. However, this inhibits interactive design because an observer must keep looking between the displays 150 and 152.

Figure 18:
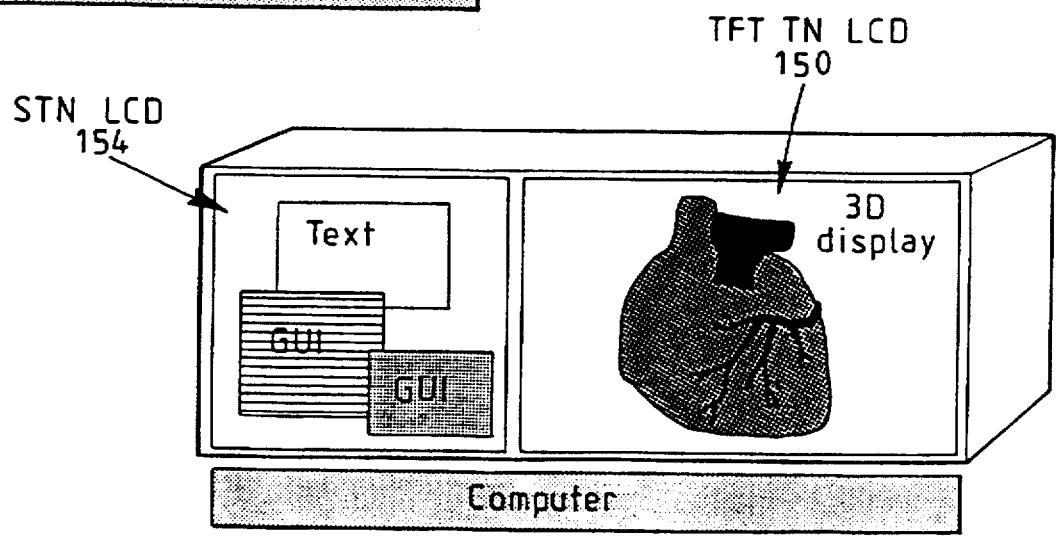
FIG. 18 illustrates a display comprising a 3D display and a 2D display integrated into a common chassis and providing a common image plane.

FIG. 18 illustrates another approach, in which one or more separate 2D displays 154 is integrated into the same chassis as the 3D display 150. The 2D display 154 may be embodied as a super-twisted nematic liquid crystal display whereas the 3D display 150 may be embodied using thin film transistor twisted nematic liquid crystal display technology. The displays 150 and 154 are arranged such that they provide a common image plane so that no observer re-accommodation is required between the displays.

Such an arrangement has various advantages. For instance, because no video information is required to be displayed by the 2D display 154, it may be embodied using super-twisted nematic technology which is relatively inexpensive. Further, a standard back light may be used for the 2D display. The display can be made as large as desired by incorporating as many individual displays as necessary. It is possible to provide a high resolution 3D image and high resolution GUI. Frame cancelling of the image by the GUI is reduced as there is no conflict between the 3D and 2D information. Standard liquid crystal display resolutions can be used for the 2D display 154. Where the 3D display 150 is of the type, for instance, shown in FIG. 6, the resolution of the 2D image can, for instance, be doubled by using two 2D display panels with their outputs combined by a beam combiner. Displays of this type are compatible with observer tracking and it is possible to provide a compact display.

It is thus possible to provide an autostereoscopic display having a high resolution 2D mode.

What is claimed is:

1. A display having a first resolution in a three dimensional display mode and a second resolution in a two dimensional display mode, the second resolution being greater than the first resolution, the display serving as an autostereoscopic display in the three dimensional mode, and wherein the display comprises at least two spatial light modulators for producing images the at least two spatial light modulators including a first spatial light modulator and at least one other spatial light modulator, wherein the at least two spatial light modulators are arranged such that in the two dimensional mode picture regions of an image produced by the first spatial light modulator are interspersed with picture regions of an image produced by each of the at least one other spatial light modulator, thereby allowing the second resolution to be enhanced compared to the first resolution.

2. A display according to claim 1, wherein the display is arranged to produce an output comprising a plurality of windows, the windows being substantially contiguous at a nominal viewing position when in the three dimensional display mode and being overlapping when in the two dimensional display mode.

3. A display as claimed in claim 1, wherein the at least two spatial light modulators are illuminated by respective light sources having a first spatial extent when the display is operated in the three dimensional display mode and a second spatial extent greater than the first spatial extent when the display is operated in the two dimensional display mode.

4. A display as claimed in claim 3, wherein each of the light sources comprises a plurality of light emitting elements which are individually controllable.

5. A display as claimed in claim 4, wherein each of the first spatial extent and the second spatial extent of each of the light sources is controlled by varying the number of light emitting elements which are illuminated simultaneously.

6. A display as claimed in claim 3, further comprising at least one imaging system for directing light from each of the light sources along predetermined directions via a respective one of the at least two spatial light modulators, each of the light sources being movable with respect to the at least one imaging system so as to vary the predetermined directions when in the three dimensional display mode.

7. A display as claimed in claim 4, further comprising: at least two electrically controllable diffusing elements switchable between a substantially non-diffusing, mode and a diffusing mode, the at least two diffusing elements being optically arranged in series with respective ones of the at least two spatial light modulators to controllably diffuse light incident on the at lest two spatial light modulators; and at least one imaging system for directing light from each of the light sources along predetermined directions via a respective one of the at least two spatial light modulators, each of the light sources being movable with respect to the at least one imaging system so as to vary the predetermined directions when in the three dimensional display mode.

8. A display as claimed in claim 1, wherein the at least two spatial light modulators are illuminated by a common light source.

9. A display as claimed in claim 8, wherein the common light source has a first spatial extent when the display is operated in the three dimensional display mode and a second spatial extent greater than the first spatial extent when the display is operated in the two dimensional display mode.

10. A display as claimed in claim 9, wherein the common light source comprises a plurality of light emitting elements which are individually controllable.

11. A display as claimed in claim 10, wherein each of the first spatial extent and the second spatial extent of the common light source is controlled by varying the number of light emitting elements which are illuminated simultaneously.

12. A display as claimed in claim 8, further comprising at least one imaging system for directing light from the common light source along predetermined directions via a respective one of the at least two spatial light modulators, the common light source being movable with respect to the at least one imaging system so as to vary the predetermined directions when in the three dimensional display mode.

13. A display as claimed in claim 8, further comprising: at least two electrically controllable diffusing elements switchable between a substantially non-diffusing mode and a diffusing mode, the at least two diffusing elements being optically arranged in series with respective ones of the at least two spatial light modulators to controllably diffuse light incident on the at lest two spatial light modulators; and at least one imaging system for directing light from the common light source along predetermined directions via a respective one of the at least two spatial light modulators, the common light source being movable with respect to the at least one imaging system so as to vary the predetermined directions when in the three dimensional display mode.

14. A display as claimed in claim 1, further comprising at least two electrically controllable diffusing elements switchable between a substantially non-diffusing mode and a diffusing mode, the at least two diffusing elements being optically arranged in series with respective ones of the at least two spatial light modulators to controllably diffuse light incident on the at lest two spatial light modulators.

15. A display as claimed in claim 14, wherein the at least two diffusing elements are arranged simultaneously to have at least one diffusing region and at least one non-diffusing region.

16. A display as claimed in claim 1, further comprising at least one beam combiner for combining the images produced by the at least two spatial light modulators.

17. A display as claimed in claim 1, comprising:
a first spatial light modulator for selectively transmitting light polarized in a first sense; a second spatial light modulator for selectively transmitting light polarized in a second sense; and a light source switchable between a first mode for producing first and second non-overlapping polarized lights polarized in the first and second senses, respectively, and a second mode for producing a light transmitted by both the first spatial light modulator and the second spatial light modulator.

18. A display as claimed in claim 17, wherein the first spatial light modulator and the second spatial light modulator are spatially multiplexed within a single spatial light modulator.

19. A display as claimed in claim 17, wherein the light produced in the second mode is unpolarized.

20. A display as claimed in claim 17, wherein the first sense and the second sense are first and second directions and are orthogonal, and the second mode produces light polarized along a third direction bisecting the first and second directions.

21. A display as claimed in claim 17, wherein the first and second senses are left handed circularly polarized and right handed circularly polarized, respectively.

22. A display comprising first display means for producing a three dimensional image at an image plane and second display means for producing a two dimensional image adjacent the three dimensional image and in the image plane, the first display means comprising a first display having a first resolution in a three dimensional display mode and a second resolution in a two dimensional display mode, the second resolution being greater than the first resolution, the first display serving as an autostereoscopic display in the three dimensional mode, and wherein the first display comprises at least two spatial light modulators for producing images the at least two spatial light modulators including a first spatial light modulator and at least one other spatial light modulator, wherein the at least two spatial light modulators are arranged such that in the two dimensional mode, picture regions of an image produced by the first spatial light modulator are interspersed with picture regions of an image produced by each of the at least one other spatial light modulator, thereby allowing the second resolution to be enhanced compared to the first resolution.

\* \* \* \* \*